(12) United States Patent
Tran et al.

(10) Patent No.: US 8,406,404 B2
(45) Date of Patent: Mar. 26, 2013

(54) METHOD FOR SETTING UP A CONFERENCE CALL IN TELECOMMUNICATIONS NETWORK USING THE SIP PROTOCOL

(75) Inventors: Nhut Quan Tran, Saint Prix (FR); Karimkhan Remtoula, Creteil (FR)

(73) Assignee: Alcatel Lucent, Paris (FR)

(*) Notice: Subject to any disclaimer, the term of this patent is extended or adjusted under 35 U.S.C. 154(b) by 1490 days.

(21) Appl. No.: 11/670,863

(22) Filed: Feb. 2, 2007

(65) Prior Publication Data
US 2007/0200924 A1 Aug. 30, 2007

(30) Foreign Application Priority Data
Feb. 6, 2006 (EP) ...................................... 06300112

(51) Int. Cl.
*H04M 3/42* (2006.01)
*H04L 12/16* (2006.01)
(52) U.S. Cl. ..................... 379/202.01; 370/259; 455/416
(58) Field of Classification Search ............. 379/202.01; 370/259–271; 455/414.01–417; 348/14.08, 348/14.09, 14.1
See application file for complete search history.

(56) References Cited

U.S. PATENT DOCUMENTS

| 6,018,360 | A  | * | 1/2000 | Stewart et al. | 348/14.09 |
| 7,738,432 | B2 | * | 6/2010 | Bhatt et al.   | 370/338   |
| 2004/0190702 | A1 | * | 9/2004 | Mayer et al. | 379/202.01 |
| 2005/0058125 | A1 | * | 3/2005 | Mutikainen et al. | 370/354 |
| 2005/0091380 | A1 | * | 4/2005 | Gonen et al. | 709/227 |
| 2005/0154571 | A1 | * | 7/2005 | Anantharangachar et al. | 703/13 |

OTHER PUBLICATIONS

Sipping WG; J. Rosenberg et al, "Models for Multi Party Conferencing in SIP; draft-rosenberg-sip-conferencing models-01.txt", IETF Standard-Workiing-Draft, Internet Engineering Task Force, IETF, Ch, No. 1, Jul. 20, 2001, XP015034694.
FTW; I. Miladinovic et al, "SIP Extension for Multiparty Conferencing; draft-miladinovie-sip-multiparty-ext-00.tx", IETF Standard-Working-Draft, Internet Engineering Task Force, IETF, Ch, Feb. 6, 2001, XP015004409.

* cited by examiner

*Primary Examiner* — Rasha Al Aubaidi
(74) *Attorney, Agent, or Firm* — Fay Sharpe LLP

(57) ABSTRACT

This invention relates to a method for setting up a conference call in a telecommunications network using the SIP protocol to set up a communication between a first terminal (30) and a second terminal (32), call controllers ($36_{ca30}$, $36_{ca32}$) relaying signals for this communication.
According to the invention, such a method is characterized in that it comprises the following steps:
the step to interrupt communication of the first terminal (30) with the second terminal (32) to set up a communication between this first terminal (30) and a conference bridge ($38_{pc}$),
the step to simulate the second terminal (32) maintaining its communication with the first terminal (30) using at least one of the call controllers ($36_{ca30}$, $36_{ca32}$), and
the step to simulate the second terminal (32) interrupting its communication with the first terminal (30) to set up a communication between this second terminal and the conference bridge ($38_{pc}$).

18 Claims, 3 Drawing Sheets

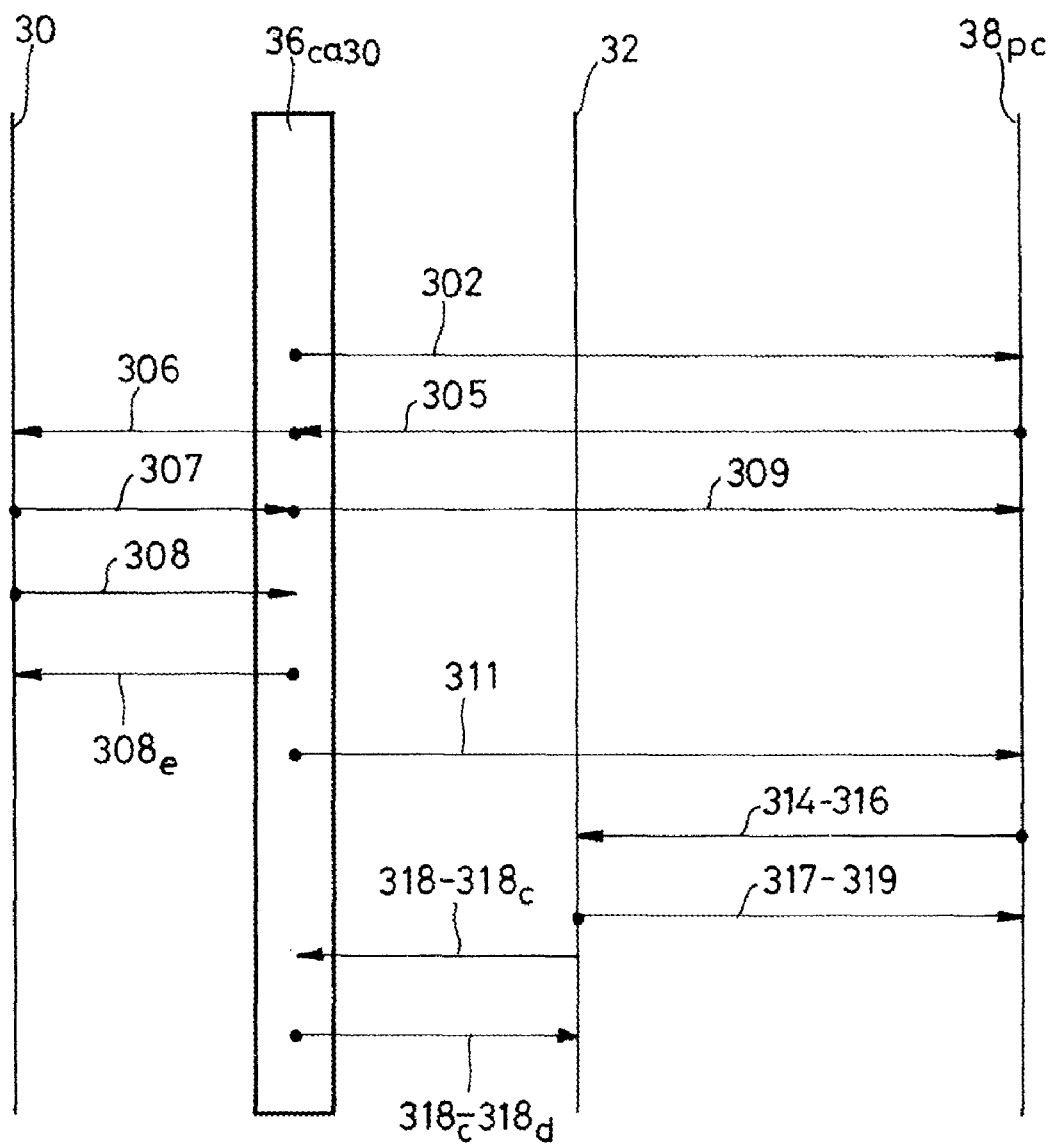
FIG_3b

METHOD FOR SETTING UP A CONFERENCE CALL IN TELECOMMUNICATIONS NETWORK USING THE SIP PROTOCOL

This invention relates to a method for setting up a conference call in a telecommunications network using the SIP protocol and a server designed to implement such a method.

A telecommunications network can transmit communications using the Internet network protocol or the "IP" internet protocol. When this transmission relates to a telephone communication, it may also be called 'voice over IP'.

It is known that such a 'voice over IP' telephone communication can be set up and managed by making use of the SIP 'Session Initiation Protocol', this protocol being defined by the RFC 3261 standard published by the Internet Engineering Task Force organization.

Figure 1:
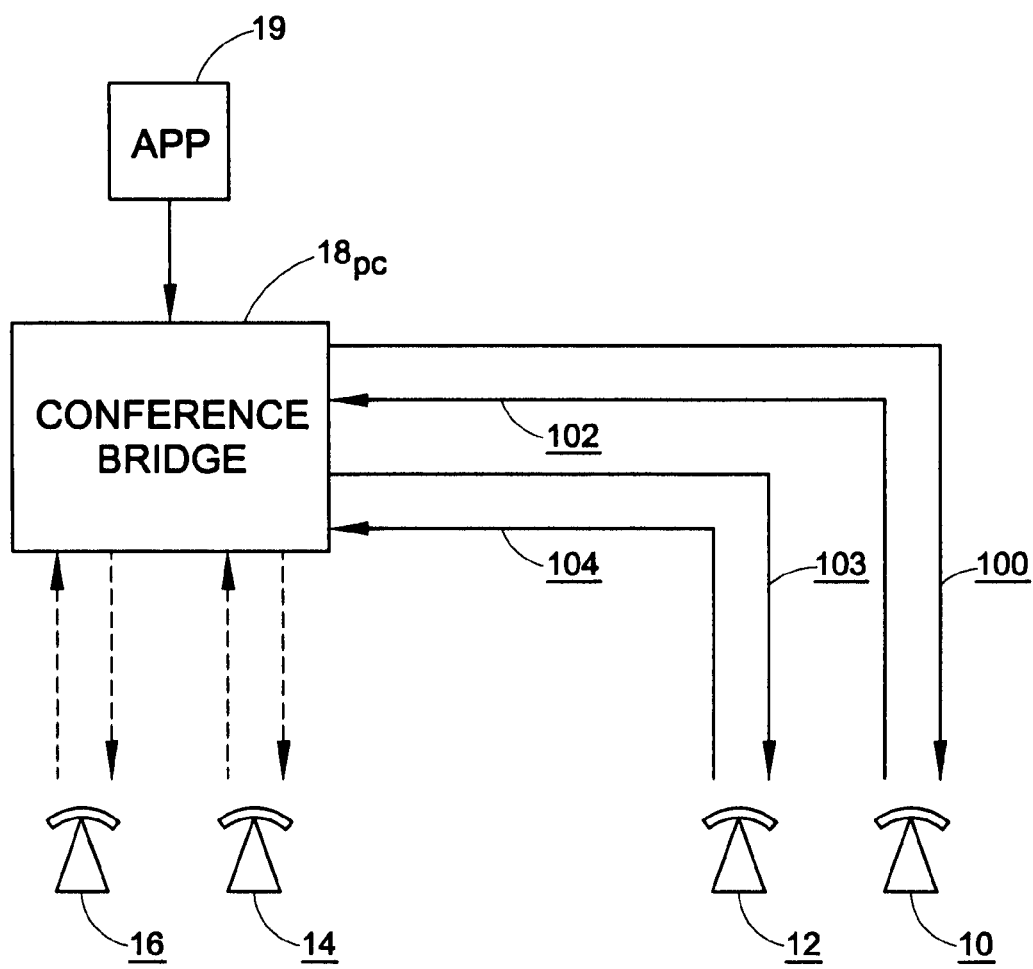
Figure 2:
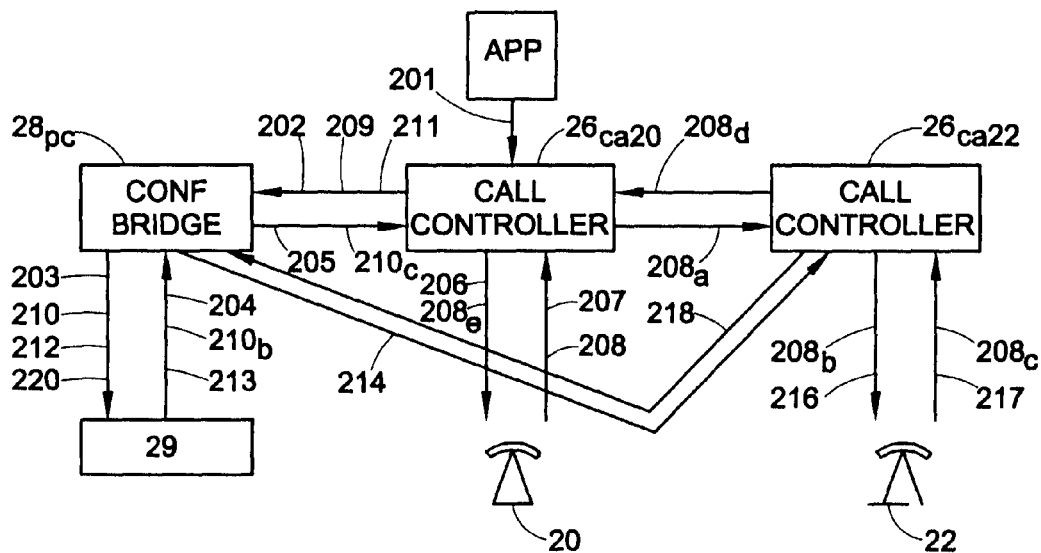

It is possible to set up a conference call within the framework of this SIP protocol, in other words a 'voice over IP' type communication in which more than two separate terminals can participate. Two methods described in detail below with reference to FIGS. 1 and 2 are currently used to set up such a conference call starting from an existing communication between two terminals.

According to a first method shown in FIG. 1, a conference call is set up between terminals 10, 12, 14 and 16 by setting up all communications output from these terminals by means of a server $18_{pc}$, called the conference bridge in the following, that includes software and physical resources such as connectors to set up a conference call between these different terminals.

Assuming that the user of the terminal 10 would like to set up a communication with the user of the terminal 12, the user of the terminal 10 informs the bridge $18_{pc}$ about this request by means of an application 19. The conference bridge $18_{pc}$ then transmits a first signal 100 inviting the terminal 10 to start a communication with the terminal 12.

When the terminal 10 gives its agreement (signal 102) for this communication, the conference bridge $18_{pc}$ transmits a signal 103 inviting the terminal 12 to start a communication with the terminal 10 such that when this terminal 12 accepts this communication (signal 104), the conference bridge $18_{pc}$ can set up and manage a communication between these terminals 10 and 12.

Since the communication between the terminals 10 and 12 is managed by a conference bridge $18_{pc}$, the terminals 14 or 16 can join the existing communication between these terminals 10 and 12. To achieve this, a simple invitation and acceptance procedure with the conference bridge $18_{pc}$ is required for each of these terminals 14 and 16, this invitation and acceptance procedure being similar to the procedure described for setting up communications between the conference bridge $18_{pc}$ and each of the terminals 10 and 12.

This first method has the disadvantage that it uses a conference bridge $18_{pc}$ for any communication set up from each of these terminals 10, 12, 14 and 16. Consequently, the resources of this conference bridge $18_{pc}$ are required even when two terminals 10 and 12 would like to make a simple communication without the participation of a third terminal, thus blocking the resources of the conference bridge $18_{pc}$ for other terminals that might like to set up a conference call.

To overcome this problem and to optimize the use of the resources of a conference bridge by allocating these resources only to communications requiring a conference call, it is known that a second method can be used, described in detail below with reference to FIG. 2, in which different signals transmitted between a single sender and a single receiver are shown by a single link, for reasons of clarity.

In this second method, signals related to the setting up and management of a communication between two terminals 20 and 22 are transmitted by servers $26_{ca20}$ and $26_{ca22}$ which differ from the conference bridge $28_{pc}$. Consequently, servers $26_{ca20}$ and $26_{ca22}$ perform a simple communication control signal relay function and are subsequently called call controllers $26_{ca20}$ or $26_{ca22}$ or more simply controllers $26_{ca20}$ or $26_{ca22}$.

Setting up a communication between the terminal 20 and the terminal 22 through these controllers $26_{ca20}$ and $26_{ca22}$ uses a method conforming to the SIP protocol during which the conference bridge is no longer required. Thus, conference bridge resources are not required for a simple communication between these two terminals 20 and 22.

When the communication is set up between the two terminals, the user of a terminal, for example terminal 20, may request that a conference call should be set up using an application 219.

In this case, the communication between the terminal 20 and the terminal 22 must be set up through the conference bridge $28_{pc}$ so that, for example, at least one third terminal can participate in a communication with terminals 20 and 22, also setting up a communication with the conference bridge $28_{pc}$.

To achieve this, a signal 201 output from an application 219 is transmitted to the controller $26_{ca20}$, this signal 201 indicating that the communication between the terminals 20 and 22 must in the future be managed through the conference bridge $28_{pc}$ to enable other terminals to participate in this communication.

After this signal 201, the controller $26_{ca20}$ transmits a signal 202 to the conference bridge $28_{pc}$ so that this conference bridge commands (signal 203) the physical conference means 29, also called Mediagateway, to set up such a communication.

When these physical means 29 confirm that a communication can be set up (signal 204) with the terminal 20, the conference bridge $28_{pc}$ transmits a signal 205 to the controller $26_{ca20}$ that can then request the terminal 20 (signal 206) to interrupt its communication in progress with the terminal 22, this interruption being aimed at allowing the communication to be set up with the conference bridge.

When the terminal 20 confirms setting up of a communication through the conference bridge $28_{pc}$ (signal 207) and its agreement to abort the communication in progress with the terminal 22 (signal 208), the call controller $26_{ca20}$ generates two signals:

A first signal 208a to be sent to the controller $26_{ca22}$ of the second terminal 22 so that the second terminal manages interruption of its communication with the terminal 20. After this first signal 208a, the controller $26_{ca22}$ transmits a signal 208b requiring the terminal 22 to abandon its communication with the terminal 20. The terminal 22 confirms that its communication has been abandoned by a signal 208c that is relayed by the controllers $26_{ca22}$ and $26_{ca20}$ to the terminal 20 (signals 208d and 208e).

A second signal 209 to inform the conference bridge $28_{pc}$ about the availability of the terminal 20 to set up a communication through this bridge $28_{pc}$.

After this second signal 209, the conference bridge 28pc may command its physical means 29 (signal 210) to set up the conference. When these means confirm that it has been set up (signal 210b), the bridge $28_{pc}$ performs a procedure to set up a communication (signal 210c) with the call controller $26_{CA20}$.

When the call controller $26_{CA20}$ (signal 211) acceptance is sent to the physical means 29 (signal 212), these physical means may request (signal 213) that the communication should be set up with the terminal 22 using an invitation and acceptance procedure in accordance with the SIP protocol, and as already described (signals 214, 216, 217, 218 and 220).

Therefore, it appears that each of the terminals 20 and 22 sets up a communication with the conference bridge $28_{pc}$ to set up a conference call.

This invention is the result of an observation specific to the invention according to which such a method is not satisfactory considering the nature of the interrupted communication between the terminals 20 and 22. The interruption to the communication is practically imperceptible to the user of the terminal 20 because the communication with the terminal 22 is abandoned at practically the same time as the communication with the bridge $28_{pc}$ is set up.

But the user of the terminal 22 that does not take the initiative to set up a conference must abandon its communication in progress with the terminal 20 and wait to be invited to a new communication by the conference bridge $28_{pc}$, such that during this waiting period, its user may have the impression that the communication with the terminal 20 is interrupted and may perform undesirable operations such as attempting to set up a communication with the terminal 20 or another terminal.

This invention is aimed at providing a method of setting up a conference call starting from a simple communication between two terminals controlled according to the SIP protocol and that has none of the disadvantages related to the methods described above, namely neither the constant use of resources specific to a conference call (first method) nor waiting without a communication for one of the terminals (second method).

This is why the invention relates to a method of setting up a conference call in a telecommunications network using the SIP protocol to set up a communication between a first terminal and a second terminal, call controllers relaying signals for this communication, and characterized in that it comprises the following steps:
- the step to interrupt communication of the first terminal with the second terminal to set up a communication between this first terminal and a conference bridge,
- the step to simulate the second terminal maintaining its communication with the first terminal using at least one of the call controllers, and
- the step to simulate the second terminal interrupting its communication with the first terminal to set up a communication between this second terminal and the conference bridge.

Such a method has many advantages. In particular, it allows a telephone communication to be set up between two terminals without abusively using the conference bridge, unlike the first method according to prior art, because a simple communication between two terminals can be made through call controllers and without requiring the use of a conference bridge.

Furthermore, a method according to the invention does not give the impression of a loss of communication for the user of a terminal when its communication with another terminal is interrupted and it remains waiting to be requested by a conference bridge, unlike the second method according to prior art. In a method according to the invention, the two terminals interrupt their communication in a real or simulated manner, practically at the same time as a communication is set up with the conference bridge.

In one embodiment, the method includes the additional step of inhibiting an interruption signal sent by the first terminal to the second terminal when its communication with this second terminal is interrupted.

According to one embodiment, the method includes the additional step of inhibiting an interruption signal sent by the second terminal to the first terminal when simulating an interruption of its communication with the first terminal.

In one embodiment, the method includes the additional step of generating a signal confirming correct transmission of an inhibited signal in order to simulate transmission of this inhibited signal.

According to one embodiment, a communication between the first terminal and the conference bridge being set up from an acceptance signal sent by this first terminal towards the bridge, the method includes the additional step of sending this acceptance signal practically at the same time as a signal is sent by the first terminal to interrupt its communication with the second terminal.

In one embodiment, a communication between the second terminal and the conference bridge being set up from an acceptance signal sent by this second terminal towards the bridge, the method includes the additional step of sending this acceptance signal practically at the same time as a signal is sent by this second terminal to simulate interruption of its communication with the first terminal.

Finally, the invention also relates to a server transmitting signals in a telecommunications network using the SIP protocol to set up a communication between a first terminal and a second terminal, characterized in that it includes means of simulating the second terminal maintaining its communication with the first terminal when the first terminal sets up a communication with a conference bridge practically at the same time, and means of simulating the second terminal interrupting its communication with the first terminal so as to set up a communication between this second terminal and the conference bridge.

With such a server, a conference call between two terminals in communication may be set up while minimizing resources required by this communication and without imposing the need for the user of the second terminal to have the impression of having lost the communication with the first terminal.

In one embodiment, the server includes means of inhibiting an interruption signal sent by the first terminal to the second terminal at the time that its communication with the second terminal is interrupted.

According to one embodiment, the server comprises means of inhibiting an interrupt signal sent by the second terminal to the first terminal when its communication with the second terminal is interrupted.

In one embodiment, the server comprises means of generating a signal confirming correct transmission of an inhibited signal and thus simulating transmission of this inhibited signal.

In one embodiment the server comprises means of triggering setting up a conference call starting from a control signal sent by an application distinct from the terminals.

Figure 3A:
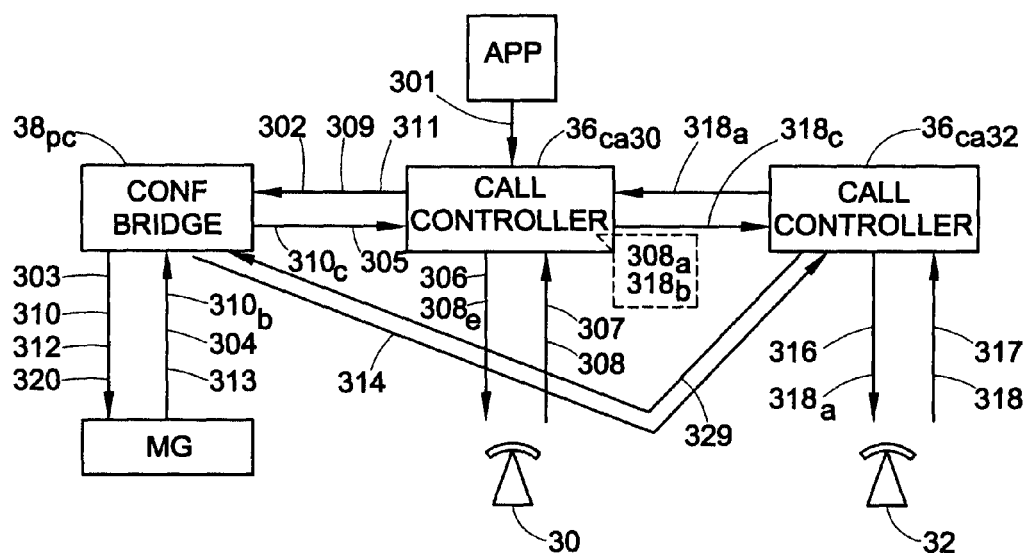

Other characteristics and advantages of the invention will become clear after reading the description of embodiments of this invention given below for illustrative and non-limitative purposes, with reference to the appended figures in which:

FIGS. 1 and 2 already described illustrate methods of setting up a conference call in accordance with prior art, FIGS. 3a and 3b illustrate a method of setting up a conference call in accordance with the invention.

In accordance with the invention, FIG. 3a describes a method of setting up a conference call starting from an existing communication between a first terminal 30 and a second terminal 32, call controllers $36_{ca30}$ and $36_{ca32}$ relaying control signals related to communications of these terminals 30 and 32 according to the SIP protocol.

For clarity reasons, the different signals transmitted between a single sender and a single receiver are shown by a single link.

Setting up and management of this existing communication between the terminal 30 and the terminal 32 according to SIP protocol through these controllers $36_{ca30}$ and $36_{ca32}$, does not require the use of a conference bridge $38_{pc}$, so that resources of this conference bridge can be optimized by assigning them only to communications between at least three terminals.

Subsequently, the user of the terminal 30 may require a conference call to be set up using an application 319.

In this case, a signal 301 output from this application 319 is transmitted to the controller $36_{ca30}$, this signal 301 indicating that a communication between the terminals 30 and 32 must be managed by the conference bridge $38_{pc}$ to set up a conference call between these two terminals 30 and 32.

After this signal 301, the controller $36_{ca30}$ transmits a signal 302 to the conference bridge 38pc that sends a request (signal 303) to the physical means 39, or <<Mediagateway>>, of the conference bridge $38_{pc}$ to set up a communication with the terminal 30.

When these physical means confirm that such a communication is possible (signal 304), the conference bridge $38_{pc}$ transmits a signal 305 to the controller $36_{ca30}$ that can then request the terminal 30 (signal 306) to abandon the communication in progress with the terminal 32.

When the terminal 30 confirms setting up a communication through the conference bridge 38pc (signal 307) and its agreement to abandon the communication in progress with the terminal 32 (signal 308), the call controller $36_{ca30}$ generates two signals in accordance with prior art, namely:

A first signal 309 to the conference bridge 38pc to give its agreement to setting up a communication through this conference bridge, and A second signal 308a addressed to the terminal 32 so that this terminal abandons its communication in progress with the terminal 30.

However, according to the invention, this call controller $36_{ca30}$ includes means of inhibiting or blocking the signal 308a such that the terminal 32 does not know that its communication with the terminal 30 is abandoned.

In other words, the terminal 32 maintaining its communication with the terminal 30 is simulated while enabling the call controller $36_{ca30}$ to send a confirmation 308e to the terminal 30 regarding transmission of the signal 308a so as to respect the SIP protocol.

When the call controller $36_{ca30}$ sends the signal 309, a series of signals 310, 310b, 310c, 311, 312 and 313 with a function similar to the series of signals 210, 210b, 210c, 211, 212 and 213 takes action to set up the communication with the terminal 30 and transmit an invitation signal 314 to the controller $36_{ca32}$.

The controller then requests the terminal 32 (signal 316) to set up a communication with the conference bridge and to abandon its simulated communication with the terminal 30, this terminal confirming that such a communication is set up through the conference bridge 38pc (signal 317) while transmitting its agreement to abandon the simulated communication with the terminal 30 (signal 318). This is why the call controller $36_{ca32}$ transmits two signals, namely:

A first signal 329 to the conference bridge $38_{pc}$ to give its agreement to set up a communication through the conference bridge $38_{pc}$ communication set up by the physical means 39 following the signal 320, and A second signal 318a addressed to the controller $36_{ca30}$ of the first terminal 30 to interrupt the simulated communication.

The call controller $36_{ca30}$ comprises means of inhibiting or blocking this signal 318a and means of transforming this signal 318a into an internal signal 318b that leads to the call controller $36_{ca30}$ sending a signal 318c to the call controller $36_{ca32}$ without calling upon the terminal 30, to confirm interruption of the simulated communication between terminals 30 and 32.

Thus, the signal 318c enables the terminal 32 to set up a communication with the conference bridge $38_{pc}$ while abandoning the communication with the terminal 30.

With the method conforming with the invention, it appears that the communication in progress between terminals 30 and 32, directly managed by the call controllers $36_{ca30}$ and $36_{ca32}$, was transformed into a communication managed through the conference bridge $38_{pc}$ avoiding a waiting period for the terminal 32 between when its communication with the terminal 30 is interrupted and when its communication with the conference bridge $38_{pc}$ is set up.

In fact, the communication for each terminal 30 and 32 is interrupted at practically the same time as their corresponding communications are set up with the conference bridge $38_{pc}$ such that users of these terminals do not have the impression of losing the communication in progress when the conference call is set up.

FIG. 3b schematically illustrates the chronology of exchanges of some of the signals mentioned above.

Thus, FIG. 3b shows terminals 30 and 32, the controller $36_{ca30}$ and the conference bridge 28pc in columns from which the different signals described below are located.

Such a representation illustrates details of the blockage or inhibition made by the call controller $36_{ca30}$ with regard to the signal 308 sent by the terminal 30 and with regard to the signal 318a sent by the terminal 32.

This representation also illustrates the practically simultaneous sending of interrupt signals to interrupt the communication between the terminals (signal 308 for terminal 30 and 318 for terminal 32) and sending of signals to set up a communication with the conference bridge $38_{pc}$ (signal 307 for terminal 30 and 317 for terminal 32).

FIG. 3b represents the means specific to the invention in the controller 36ca30. However, it is clear that the invention could be used if the means inhibiting the disconnection signal 308a of the terminal 30 and/or the means inhibiting the disconnection signal 318a of the terminal 32 with regard to terminal 30 are located in one or several other servers such as the controller 36ca30, or in general in any other intermediate server between these two terminals.

The invention claimed is:

1. Method for setting up a conference call in a telecommunications network using Session Initiation Protocol (SIP) protocol to set up a communication between a first terminal and a second terminal, the method comprising the following steps:

interrupting the communication of the first terminal with the second terminal to set up a communication between the first terminal and a conference bridge;

simulating the second terminal maintaining its communication with the first terminal using at least one of the call controllers; and simulating the second terminal interrupting its communication with the first terminal to set up a communication between the second terminal and the conference bridge.

2. Method according to claim 1, further comprising inhibiting an interruption signal that is sent by the first terminal to the second terminal in response to the interrupting of the first terminal's communication with the second terminal.

3. Method according to claim 1, further comprising inhibiting an interruption signal that is sent by the second terminal to the first terminal.

4. Method according to claim 1, further comprising generating a signal confirming correct transmission of an inhibited signal in order to simulate transmission of the inhibited signal.

5. Method according to claim 1, wherein a communication between the first terminal and the conference bridge is being set up from an acceptance signal sent by the first terminal towards the conference bridge, the method further comprising sending the acceptance signal near a time a signal is sent by the first terminal to interrupt its communication with the second terminal.

6. Method according to claim 1, further comprising setting up a communication between the second terminal and the conference bridge using an acceptance signal sent by the second terminal towards the conference bridge wherein the acceptance signal is sent near a time a signal is sent by the second terminal to simulate interruption of its communication with the first terminal.

7. An apparatus for transmitting signals in a telecommunications network using Session Initiation Protocol (SIP) to set up a communication between a first terminal and a second terminal, comprising:
a server being adapted to simulate the second terminal maintaining communication with the first terminal in response to the first terminal setting up a communication with a conference bridge about the same time, and the server being adapted to simulate the second terminal interrupting the communication with the first terminal so as to set up a communication between the second terminal and the conference bridge.

8. The apparatus according to claim 7, further comprising a server adapted to inhibit an interruption signal that is sent by the first terminal to the second terminal at the time that the first terminal's communication with the second terminal is interrupted.

9. The apparatus according to claim 7, further comprising a server adapted to inhibit an interrupt signal that is sent by the second terminal to the first terminal when simulating an interruption to the second terminal's communication with the first terminal.

10. The apparatus according to claim 9, further comprising a server adapted to generate a signal confirming correct transmission of an inhibited signal thereby simulating transmission of the inhibited signal.

11. The apparatus according to claim 7, further comprising a server adapted to trigger setting up a conference call starting from a control signal sent by an application distinct from the terminals.

12. A method for setting up a conference call in a telecommunications network using Session Initiation Protocol (SIP) protocol to set up communication between a first terminal and a second terminal, the method comprising:
interrupting the communication of the first terminal with the second terminal to set up a communication between the first terminal and a conference bridge;
simulating maintaining the communication of the second terminal with the first terminal using at least one call controller; and
simulating interrupting the communication of the second terminal with the first terminal to set up a communication between the second terminal and the conference bridge.

13. The method according to claim 12, wherein the simulating the second terminal maintaining its communication with the first terminal further comprises inhibiting an interruption signal that is sent by the first terminal to the second terminal when the first terminal's communication with the second terminal is interrupted.

14. The method according to claim 12, wherein the simulating the second terminal interrupting its communication with the first terminal further comprises inhibiting an interruption signal that is sent by the second terminal to the first terminal.

15. The method according to claim 14, further comprising generating a signal confirming correct transmission of the inhibited signal to simulate transmission of the inhibited signal.

16. The method according to claim 12, further comprising generating a signal confirming correct transmission of an inhibited signal in order to simulate transmission of the inhibited signal.

17. The method according to claim 12, further comprising setting up a communication between the first terminal and the conference bridge based on an acceptance signal sent by the first terminal towards the bridge, and sending the acceptance signal near a time a signal is sent by the first terminal to interrupt its communication with the second terminal.

18. The method according to claim 12, further comprising setting up a communication between the second terminal and the conference bridge using an acceptance signal sent by the second terminal towards the bridge, and sending the acceptance signal near a time a signal is sent by the second terminal to simulate interruption of its communication with the first terminal.

* * * * *